(12) United States Patent
Murai et al.

(10) Patent No.: US 8,407,310 B2
(45) Date of Patent: Mar. 26, 2013

(54) METHOD FOR DATA COMMUNICATION, DATA COMMUNICATION SYSTEM AND MOBILE COMMUNICATION TERMINAL

(75) Inventors: Yusuke Murai, Tokyo (JP); Masayuki Doi, Tokyo (JP); Tatsuhiro Aoyagi, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 1105 days.

(21) Appl. No.: 11/595,911

(22) Filed: Nov. 13, 2006

(65) Prior Publication Data

US 2007/0078951 A1 Apr. 5, 2007

Related U.S. Application Data

(63) Continuation of application No. PCT/JP2005/011597, filed on Jun. 24, 2005.

(51) Int. Cl.
*G06F 15/16* (2006.01)
(52) U.S. Cl. .......................... 709/217; 709/203; 709/237
(58) Field of Classification Search ........... 709/200–253
See application file for complete search history.

(56) References Cited

U.S. PATENT DOCUMENTS

| | | | | |
|---|---|---|---|---|
| 6,032,227 A * | 2/2000 | Shaheen et al. | ............... | 711/129 |
| 6,075,994 A * | 6/2000 | Bhat | ............... | 455/458 |
| 6,377,530 B1 * | 4/2002 | Burrows | ............... | 369/59.21 |
| 6,393,524 B1 * | 5/2002 | Ayers | ............... | 711/133 |
| 6,931,198 B1 | 8/2005 | Hamada et al. | ............... | 386/46 |
| 7,159,049 B2 * | 1/2007 | Zievers | ............... | 710/29 |
| 7,483,905 B2 * | 1/2009 | Gauweiler | ............... | 1/1 |
| 2002/0141095 A1 * | 10/2002 | Yahiro | ............... | 360/69 |
| 2003/0002524 A1 | 1/2003 | Feldman et al. | | |
| 2003/0110214 A1 * | 6/2003 | Sato | ............... | 709/203 |
| 2003/0137687 A1 | 7/2003 | Onuma | ............... | 358/1.14 |
| 2004/0162890 A1 * | 8/2004 | Ohta | ............... | 709/218 |
| 2004/0203625 A1 * | 10/2004 | Kim | ............... | 455/412.1 |
| 2004/0260793 A1 * | 12/2004 | Ichikawa et al. | ............... | 709/219 |
| 2005/0228836 A1 * | 10/2005 | Bacastow et al. | ............... | 707/204 |
| 2006/0116111 A1 * | 6/2006 | Klicpera | ............... | 455/413 |

FOREIGN PATENT DOCUMENTS

| | | |
|---|---|---|
| EP | 1 271 851 A2 | 1/2003 |
| GB | 2 376 848 A | 12/2002 |
| JP | 11-249816 | 9/1999 |
| JP | 2000-032429 | 1/2000 |
| JP | 2001-290777 | 10/2001 |
| JP | 2002-41386 | 2/2002 |
| JP | 2002-157161 | 5/2002 |

(Continued)

*Primary Examiner* — David Lazaro
(74) *Attorney, Agent, or Firm* — Kratz, Quintos & Hanson, LLP

(57) ABSTRACT

A cellular phone 10 transmits a request for management information including size information of object data which is desired to be downloaded, and determines whether a size of the object data exceeds a predetermined value or not, based on the size information. If the size of the object data does not exceed the predetermined value, the cellular phone 10 stores the object data, received in response to the download request, in a temporary storage area. If the size of the object data does exceed the predetermined value, the cellular phone 10 determines whether a free area for storing the object data in a permanent storage area exists or not. If a free area exists, the object data received in response to the download request is stored in the permanent storage area. As a result, the temporary storage area to be used for storing history is not used for storing a large amount of content data, and the history of a number of operations can be held in the temporary storage area without providing a large temporary storage area.

15 Claims, 15 Drawing Sheets

FOREIGN PATENT DOCUMENTS

| | | |
|---|---|---|
| JP | 2003-101673 | 4/2003 |
| JP | 2003-177888 | 6/2003 |
| JP | 2004-138793 | 5/2004 |
| JP | 2004-303065 | 10/2004 |
| JP | 2004-320591 | 11/2004 |
| JP | 2005-31452 | 2/2005 |

* cited by examiner

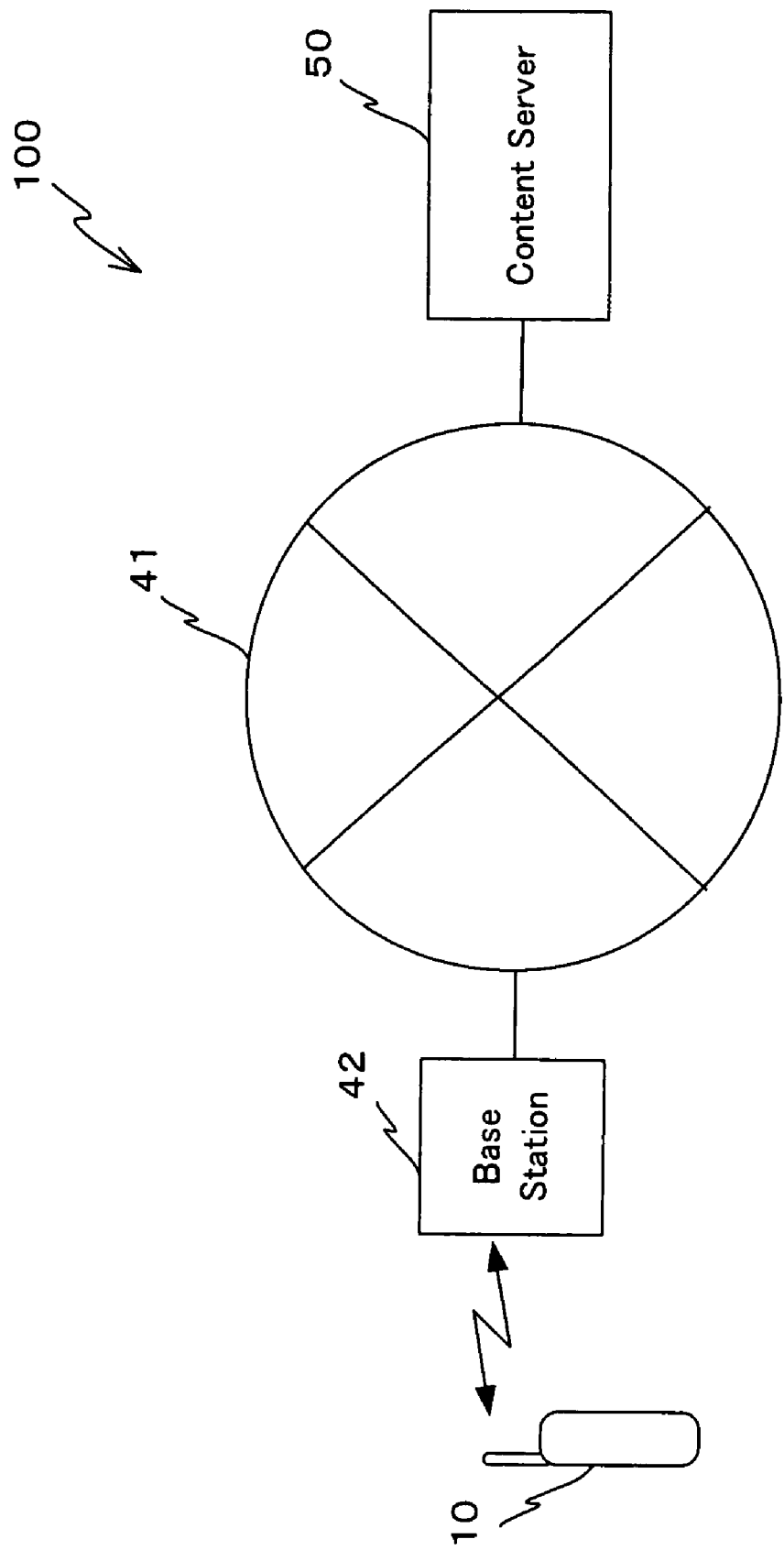

METHOD FOR DATA COMMUNICATION, DATA COMMUNICATION SYSTEM AND MOBILE COMMUNICATION TERMINAL

RELATED APPLICATION

This is a continuation application of the international patent application No. PCT/JP2005/011597 filed with Application date: Jun. 24, 2005.

BACKGROUND OF THE INVENTION

The present invention relates to a method for data communication, a data communication system, and a mobile communication terminal, and particularly to a method for data communication of downloading data from a server unit to a communication terminal, a data communication system which uses the method for data communication, and a mobile communication terminal which is used in the data communication system.

BACKGROUND ART

Mobile communication terminals, of which a cellular phone is a typical example, have been hitherto used widely. There has been a remarkable improvement in functions and performance of the mobile communication terminals. It has become normal to install a browser function in the mobile communication terminal, in addition to a conversation function and a message transceiving function which are essential functions as the mobile communication terminal. Moreover, in the mobile communication terminal, downloading of computer program data such as games from a server unit to the mobile communication terminal by using the browser function, and then running of the downloaded computer program in the mobile communication terminal have been performed.

Moreover, downloading of image data such as a still picture and a moving picture, viewing upon displaying an image related to the image data downloaded to an information communication terminal, and using as a wall paper in a display section, have been performed. Furthermore, downloading of sound data such as a melody and a song, listening to music related to the sound data downloaded, and using the sound data as a melody for an incoming call or an e-mail, have been performed.

Such contents data, in many cases, is downloaded from the server unit via a mobile communication network. At the time of downloading the content data via the mobile communication network, to the mobile communication terminal, the content data downloaded from the server unit is stored in a temporary storage area. A history of an operation as a browser, and the content data downloaded are also stored temporarily in this temporary storage area. When there is a command of saving the content data by a user, the content data is saved temporarily in a permanent storage area in which stored data is not deleted when there is no explicit command from the user.

Moreover, since the history of the browser operation and data associated are stored in the temporary storage area, by referring to the temporary storage area, it is possible to reproduce a state of a previous browser operation, and to reproduce a state of transition of the browser operation later, from recreating the state of the previous browser operation. Note that the history and the data associated are stored sequentially in the temporary storage area. However, when a free area in the temporary storage area is not sufficient for storing the latest history and the data associated, the history and the data associated which are stored are deleted in an order from old data.

SUMMARY OF THE INVENTION

An amount of content data provided in a server for the mobile communication terminal mentioned above, tends to increase with upgrading of improvement in the content. Therefore, when content data is downloaded by a conventional method, in a case in which the content data is substantial, there occur to be many cases in which a free area in a permanent storage area is not sufficient finally for using the content data. In such a case, a user by specifying explicitly, stores the downloaded data after deleting the data in a permanent storage having a low priority. When the download data has the lowest priority, the download operation carried out for long time used to be wasted.

Moreover, when the content data is downloaded by the conventional method, the content data is stored temporarily in a temporary storage area. However, when an amount of content data is substantial, the number of types of data associated and the history, becomes extremely less. Therefore, increasing the temporary storage area can be taken into consideration. However, when the temporary storage area is increased, a scale of a structure of an apparatus becomes an inevitably large scale. Moreover, since substantial content data is not downloaded frequently, a situation in which a substantial idle area is developed in the temporary storage area most of the time is caused.

The present invention is made in view of the abovementioned circumstances, and it is an object of the present invention to provide a method for data communication, and a data communication system, which are capable of improving the convenience of the user with a simple structure.

Moreover, it is an object of the present invention to provide a mobile communication terminal which can be used in the data communication system of the present invention.

According to a first view point of the present invention, there is provided a method for data communication of downloading data to a communication terminal which is in a process of executing a browser application, comprising steps of: making a request for object-data management information, at which the communication terminal transmits a request for object-data management information which includes size information of object data desired to be downloaded; receiving the object-data management information by the communication terminal; judging a data size at which the communication terminal makes a judgment of whether or not a size of the object data exceeds a predetermined size, based on the size information of the object data; making a request for a first downloading, at which when a judgment result at the step of judging the data size is negative, the communication terminal transmits a request for downloading the object data; storing a first object data, at which the communication terminal receives the object data and stores the object data in a temporary storage area which stores a history of the browser application; judging a free area, at which, when the judgment result at the step of judging the data size is affirmative, a judgment of whether or not there exists a free area for storing the object data in a permanent storage area in which stored data is not deleted when there is no explicit command from a user is mad; making a request for a second downloading at which, when a judgment result at the step of judging the free area is affirmative, the communication terminal transmits a request for downloading the object data; and storing a second object data, at which the communication terminal receives the object data and stores the object data in the permanent storage area.

In this method of data communication, first of all, at the step of making the request for object-data management information, the communication terminal which is in the process of executing the browser application, transmits the request for the object-data management information which includes the size information of the object data desired to be downloaded. A server unit of the object-data management information which has received the request for object-data management information transmits the object-data management information to the communication terminal. Thus, the communication terminal receives the object-data management information which is transmitted from the server unit of the object-data management information, at the step of making the request for object-data management information.

Next, the communication terminal which has received the object-data management information, at the step of judging the data size, makes the judgment of whether or not the size of the object data exceeds the predetermined size, based on the size information of the object data. In this case, the predetermined size is a data size determined in advance from a point of view of securing number of histories stored in the temporary storage area as a browser application, when stored in the temporary storage area as associated data of the history of downloading of the object data.

When the judgment result at the step of judging the data size is negative, in other words, when the size of the object data does not exceed the predetermined size, at the step of making the request for the first downloading, the communication terminal transmits the request for downloading the object data. When the object data is sent back in response to the request for downloading, at the step of storing the first object data, the communication terminal receives the object data and stores the object data in the temporary storage area which stores the history of the browser application. Note that at the time of storing the object data in the temporary storage area, sometimes, previous history is deleted from the temporary storage area. However, since a size of the object data to be stored newly is limited, the previous history is not deleted to a large extent such that a usability of a later history is affected considerably.

On the other hand, when the judgment result at the step of judging the data size is affirmative, in other words, when the size of the object data exceeds the predetermined size, at the step of judging the free area, the communication terminal makes the judgment of whether or not there exists a free area for storing the object data in the permanent storage area in which the stored data is not deleted when there is no explicit command from the user, based on the size information of the object data. When the judgment is affirmative, at the step of making the request for the second downloading, the communication terminal transmits the request for downloading the object data.

A server unit of the object data which has received the request for the downloading (which may be same as the server unit of the object-data management information, or may be different) transmits the object data to the communication terminal. In the communication terminal, the object data transmitted from the server unit of the object data is received and stored in the permanent storage area, at the step of storing the second object data.

As a result of this, the object data according to the size of the data is stored in the temporary storage area or in the permanent storage area when it is possible. Therefore, without providing a large temporary storage area, it is possible to hold a history of an appropriate number of operations in the temporary storage area, and the purpose is served without performing an operation of unnecessary downloading. Consequently, according to the method for data communication of the present invention, it is possible to improve the convenience for the user by a simple structure.

The method for data communication of the present invention can be let to further comprise a step of suggesting securing of a free area size, at which, when the judgment result at the step of judging the free area is negative, the communication terminal suggests the user to secure a size of the free area not smaller than a size of the object data. In this case, when the judgment result at the step of judging the free area is negative, at the step of suggesting securing of the free area size, the user is suggested by the communication terminal to secure the size of the free area not smaller than the size of the object data. As a result of this, the user can make a judgment of whether or not it is necessary to secure a storage area for the object data, before downloading.

Moreover, the method for data communication of the present invention, can be let to further comprise a step of determining a data communication method which is to be used for downloading the object data, based on the size information by the communication terminal which has received the object-data management information, and at the step of making the request for downloading, a request for downloading of the object data can be transmitted upon specifying the communication method which is determined.

In this case, at the step of determining the data communication method, the communication terminal which has received the object-data management information, determines the data communication method to be used for downloading the object data, based on the size information of the object data which is included in the object-data management information. At the time of determining the data communication method, the communication terminal predicts an efficiency of a line and a downloading time, and determines a data communication method which is considered to be appropriate. For example, when the size of the object data is smaller than the predetermined size, a packet communication method can be determined to be the data communication method, and when the size of the object data is not smaller than the predetermined size, a line-switching communication method can be determined to be the data communication method. As a result of this, irrespective of the size of the object data, the downloading of the object data can be completed in a reasonable time without causing a decline in the efficiency of the line.

Moreover, the method for data communication of the present invention, can be let to further comprise a step of confirming a request for downloading, at which, the communication terminal which has received the object-data management information entrusts to a judgment of the user of the communication terminal as to whether or not to execute the step of making the request for downloading upon displaying the size of the object data. In this case, the user, upon looking at the size of the object data, and taking into consideration the downloading time predicted, and a lead time for downloading at that point of time, can determine whether or not to download the object data at that point of time.

Moreover, the method for data communication can be let to further comprise a step of making a request for downloading of a remaining portion, at which, when the downloading of the object data is not completed at the step of storing the object data, the communication terminal makes a request for downloading the remaining portion which is a request for downloading related to the remaining portion which is a portion other than a portion which is already downloaded; and a step of storing the remaining portion, at which, the communication terminal receives the remaining portion and stores the remaining portion in the permanent storage area.

In this case, when an operation of downloading the object data is ended without the downloading of the object data being completed due to time out or disconnection of the line, the communication terminal, at the step of making the request for downloading of the remaining portion, makes the request for downloading the remaining portion which is a request for downloading related to the remaining portion which is a portion other than the portion which is already downloaded. The server unit of the object data which has received the request for downloading of the remaining portion, transmits the remaining portion of the object data to the communication terminal. Thus, the communication terminal receives the remaining portion of the object data transmitted from the server unit of the object data at the step of receiving the remaining portion. Therefore, even when the downloading of the object data is ended half way, the purpose is served only by downloading only the remaining portion at the time of completion of the previous downloading operation, without performing the downloading of the entire object data once again. Consequently, it is possible to download the object data efficiently.

According to a second view point of the present invention, in a data communication system which downloads data to a communication terminal which is in a process of executing a browser application, the communication terminal comprises: a means for making a request for object-data management information which transmits a request for object-data management information which comprises size information of object data desired to be downloaded; a data-size judging means which makes a judgment of whether or not a size of the object data exceeds a predetermined size, based on the size information of the object data; a first-downloading means which, when a judgment result of the judgment made by the data-size judging means is negative, transmits a request for downloading the object data, and stores the object data which is sent back in a temporary storage area which stores a history of the application; a free area judging means which, when the judgment result of the judgment made by the data-size judging means is affirmative, makes a judgment of whether or not there exists a free area for storing the object data in a permanent storage area in which stored data is not deleted when there is no explicit command from a user; and a second-downloading means which, when the judgment result of the judgment made by the free area judging means is affirmative, transmits a request for downloading the object data, and stores the object data which is sent back in response to the request for downloading to the permanent storage area.

In this data communication system, the means for making the request for the object-data management information transmits the request for the object-data management information which comprises the size information of the object data desired to be downloaded. Based on the size information of the object-data management information sent back in response to the request for the object-data management information, the data-size judging means makes a judgment of whether or not the size of the object data exceeds the predetermined size.

When the judgment result of the judgment made by the data-size judging means is negative, the first-downloading means transmits the request for downloading the object data. Further, the first-downloading means stores the object data which is sent back, in the temporary storage area which stores the history of the application.

On the other hand, when the judgment result of the judgment made by the data-size judging means is affirmative, the free area judging means makes the judgment of whether or not there exists a free area for storing the object data in the permanent storage area in which stored data is not deleted when there is no explicit command from the user. When the judgment is affirmative, the second-downloading means transmits the request for downloading the object data, and stores the object data which is sent back in response to the request for downloading to the permanent storage area.

In other words, in the data communication system of the present invention, it is possible to download the object data in the communication terminal by using the method for data communication of the present invention mentioned above. Consequently, according to the data communication system of the present invention, it is possible to improve the convenience for the user by a simple structure.

The data communication system of the present invention can be structured to further comprise: a management information server unit which transmits the object-data management information to the communication terminal, in response to a request for the object-data management information; and an object-data server unit which transmits the object data by the communication method which is determined, to the communication terminal.

In this case, (i) the management-information server unit and the object-data server unit can be let to be one and the same unit, and (ii) the management-information server unit and the object-data server unit can be let to be mutually different units. Note that when the management-information server unit and the object-data server unit are let to be mutually different units, it becomes necessary that the object-data management information further comprises information of a position at which the object-data server unit is located.

Moreover, in the data communication system of the present invention, the communication terminal can be structured to be a mobile communication terminal. In this case, it is possible to download the object data to the mobile communication terminal having a simple structure, while improving the convenience for the user.

According to a third view point of the present invention, a mobile communication terminal which is capable of executing a browser application comprises: a means for making a request for object-data management information which transmits a request for object-data management information which comprises size information of object data desired to be downloaded while executing the browser application; a data-size judging means which makes a judgment of whether or not a size of the object data exceeds a predetermined size, based on the size information of the object data; a first-downloading means which, when a judgment result of the judgment made by the data-size judging means is negative, transmits a request for downloading the object data, and stores the object data which is sent back, in a temporary storage area which stores a history of the application; a free area judging means which, when the judgment result of the judgment made by the data-size judging means is affirmative, makes a judgment of whether or not there exists a free area for storing the object data in a permanent storage area in which stored data is not deleted when there is no explicit command from a user; and a second-downloading means which, when a judgment result of the judgment made by the free area judging means is affirmative, transmits a request for downloading the object data, and stores the object data which is sent back in response to the request for downloading, in the permanent storage area.

In this mobile communication terminal, the means for making the request for object-data management information transmits the request for object data management information which comprises the size information of the object data desired to be downloaded. Based on the size information in the object-data management information which is sent back in response to the request for the object-data management information, the data-size judging means makes the judgment of whether or not the size of the object data exceeds the predetermined size.

When the judgment result of the judgment made by the data-size judging means is negative, the first-downloading means transmits the request for downloading the object data. Furthermore, the first-downloading means stores the object data which is sent back, in the temporary storage area which stores the history of the application.

On the other hand, when the judgment result of the judgment made by the data-size judging means is affirmative, the free area judging means makes the judgment of whether or not there exists a free area for storing the object data in a permanent storage area in which the stored data is not deleted when there is no explicit command from the user. When the judgment is affirmative, the second-downloading means transmits the request for downloading the object data, and stores object data which is sent back in response to the request for downloading, in the permanent storage area.

In other words, by using the mobile communication terminal of the present invention as the communication terminal in the data communication system mentioned above, it is possible to perform the operation of downloading the object data to the mobile communication terminal having a simple structure while improving the convenience for the user, by using the method for data communication of the present invention. Consequently, it is possible to use appropriately the mobile communication terminal of the present invention in the data communication system of the present invention.

In the mobile communication terminal of the present invention, the free area judging means can be let to be structured to suggest the user to secure a size of the free area not smaller than a size of the object data, when the judgment result at the step of judging the free area is negative. In this case, by looking at a display of suggestion for securing the free area size, which is displayed by the free area judging means, the user can make a judgment of whether or not it is necessary to secure a storage area for the object data before downloading the object data.

Moreover, the mobile communication terminal of the present invention may be let to comprise further a data-communication method determining means which determines a data communication method to be used for downloading the object data, based on the size information, and the first downloading means and the second downloading means may be structured to transmit a request for downloading of the object data upon specifying the communication method which is determined. In this case, the data-communication method determining means determines the data-communication method to be used for downloading the object data, based on the size information of the object data comprised in the object-data management information. As a result of this, irrespective of the size of the object data, the downloading of the object data can be completed in a reasonable time without causing a decline in the efficiency of the line.

Moreover, in the mobile communication terminal of the present invention, the first downloading means and the second downloading means can be let to be structured to entrust to a judgment of the user as to whether or not to transmit the request for downloading upon displaying the size of the object data. In this case, the user, upon looking at the size of the object data, and taking into consideration the downloading time predicted, and a lead time for downloading time at that point of time, can determine whether or not to download the object data at that point of time.

Moreover, in the mobile communication terminal of the present invention, the structure can be such that the permanent storage area is divided according to a type of data, and the object-data management information further comprises information of a type of object data. In this case, the object data can be stored in the area divided, of the permanent storage area, which is divided according to the type of the object data (for example, a folder according to the type of data).

As it has been described above, according to the method for data communication and the data communication system of the present invention, there is shown an effect that a convenience for the user can be improved by a simple structure.

Moreover, according to the mobile communication terminal of the present invention, there is shown an effect that the mobile communication terminal of the present invention can be used in the data communication system of the present invention.

BRIEF DESCRIPTION OF THE DRAWINGS

FIG. 1 is a block diagram showing schematically a structure of a data communication system according to an embodiment of the present invention;

DETAILED DESCRIPTION

Figure 2A:
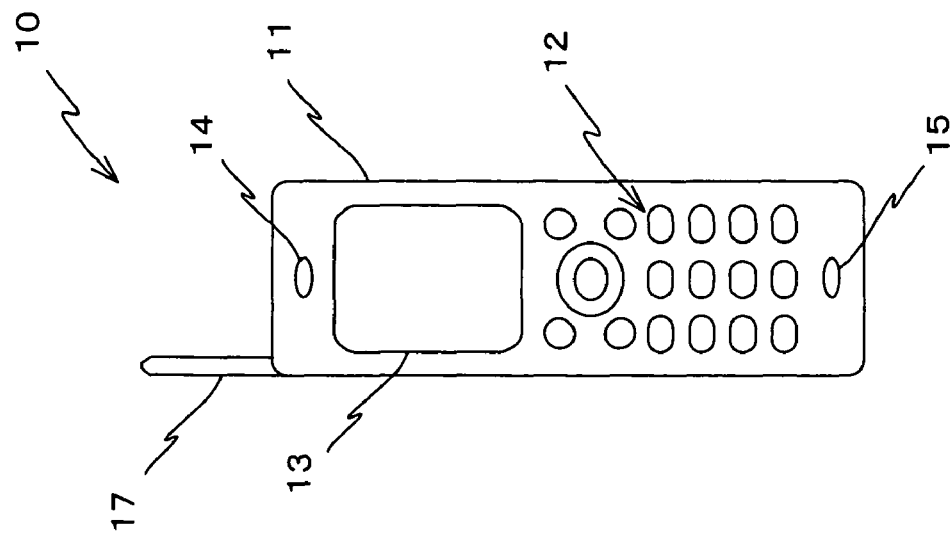
FIG. 2A is a diagram showing schematically a front-side external view of a cellular phone in FIG. 1.

An embodiment of the present invention will be described below while referring to FIG. 1 to FIG. 15. Note that in the diagrams from FIG. 1 to FIG. 15, the same reference numerals are assigned to the same or the similar components, and the repetition of description is omitted.

In FIG. 1, a structure of a data communication system 100 according to the embodiment of the present invention is shown schematically. As shown in FIG. 1, the data communication system 100 includes (a) a cellular phone 10, (b) a communication network 41 to which the cellular phone 10 is connected via a base station 42 which performs wireless communication with the cellular phone 10, and (c) a content server 50 which is connected to the communication network 41. In this case, there is a plurality of cellular phones and communication networks. However, in FIG. 1, one cellular phone 10 and one base station 42 are shown as representatives.

Figure 2B:
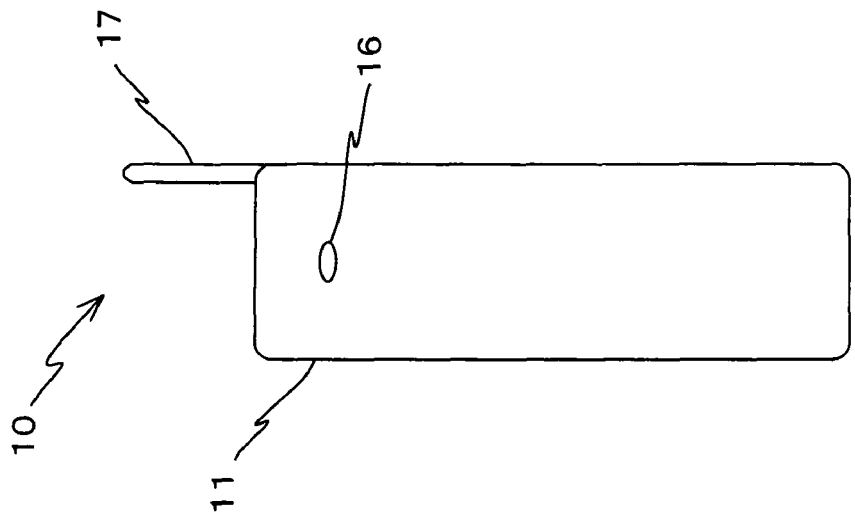
FIG. 2B is a diagram showing schematically a rear-side external view of the cellular phone in FIG. 1.

In FIG. 2, an external structure of the cellular phone 10 is shown schematically. As shown in FIG. 2, the cellular phone 10 comprises (a) a cellular phone main body 11 (refer to FIG. 3) which includes a control section 21 which will be described later, (b) an operating section 12 which has a numerical key pad for inputting a telephone number and function keys for inputting in the control section 21, various commands such as switching of operating mode, and (c) a display section 13 which has a liquid-crystal display which displays operation instructions, operation status, message received and so forth, according to a command from the control section 21. Moreover, the cellular telephone 10 comprises (d) a speaker for conversation 14 which reproduces an aural signal transmitted from a communication counterpart during conversation, (e) a microphone 15 for inputting sound while collecting the sound, and inputting voice during conversation, and (f) a speaker for instructions 16 for generating a sound informing incoming call and instruction sound, according to a command from the control section 21. Furthermore, the cellular phone 10 comprises (g) an antenna 17 for transceiving a wireless signal between the cellular phone 10 and the base station 42.

Figure 3:
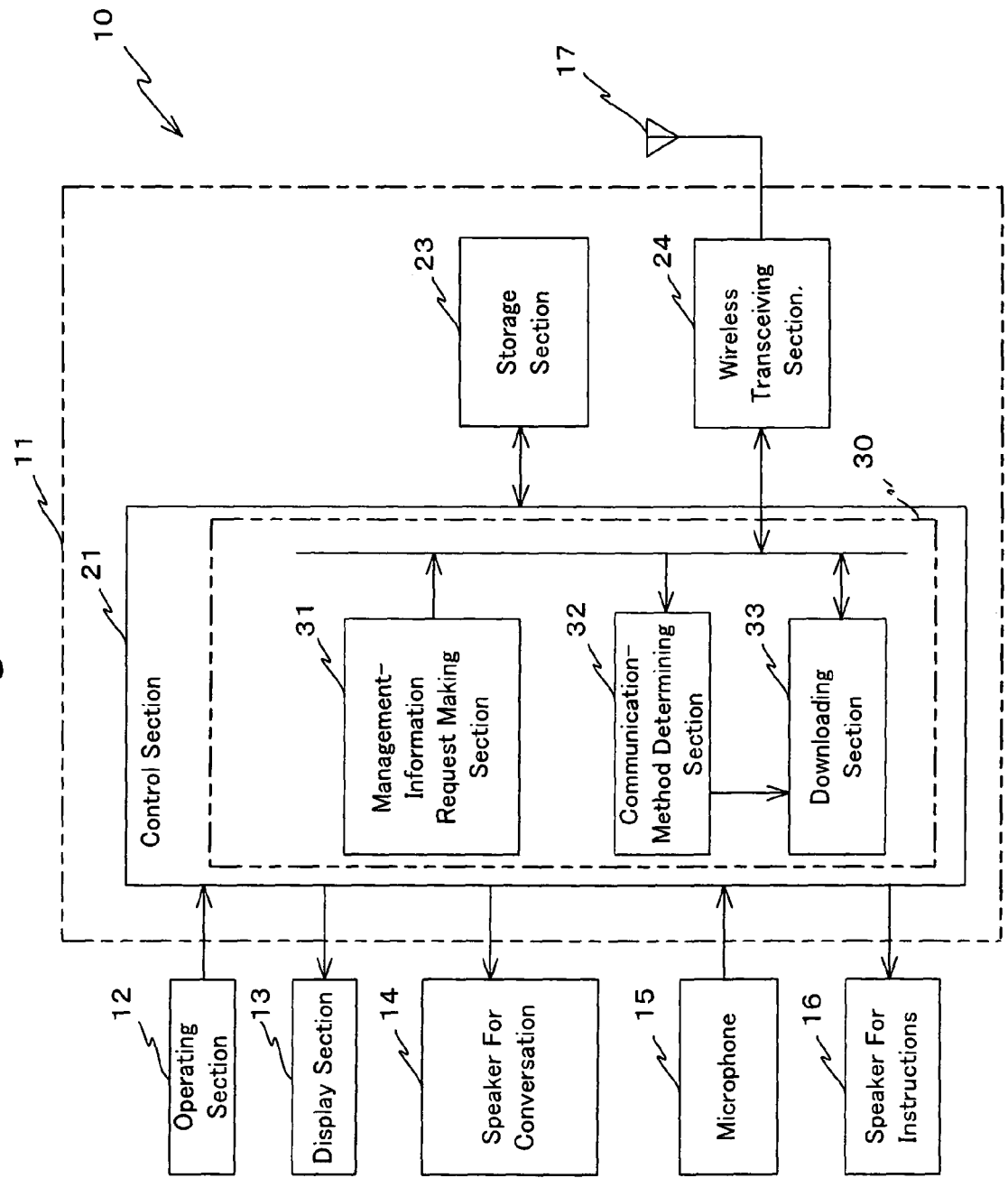
FIG. 3 is a functional block diagram for describing an internal structure of the cellular phone in FIG. 2A and FIG. 2B.

In this case, as shown in FIG. 3, the cellular phone main body 11 includes inside the body (i) the control section 21 which performs integrated control of the operation of the entire cellular phone 11, (ii) a storage section 23 which has a read only memory (ROM) and a random access memory (RAM) and so forth, and (iii) a wireless transceiving section 24 for performing communication between the cellular phone 10 and the base station 42.

The control section 21 has a central processing unit (CPU) and a digital signal processor (DSP) and so forth, and is a processing device for executing a computer program. Various computer programs including a data communication program 30 for downloading content data are executed in the control section 21.

The data communication program 30 comprises (i) a management-information request making section 31, (ii) a communication-method determining section 32, and (iii) a downloading section 33. The management-information request making section 31 transmits a request for management information related to content data which is desired to be downloaded to the content server 50. The communication-method determining section 32 determines a data communication method to be used for downloading object data, based on size information of object data in the management information which is sent back from a server unit in response to the request for management information. The downloading section 33 makes a request for downloading of the content data, receives the content data which is downloaded, and calls a variety of attentions of a user at the time of downloading. Note that the management information of the content data will be described later.

Figure 4A:
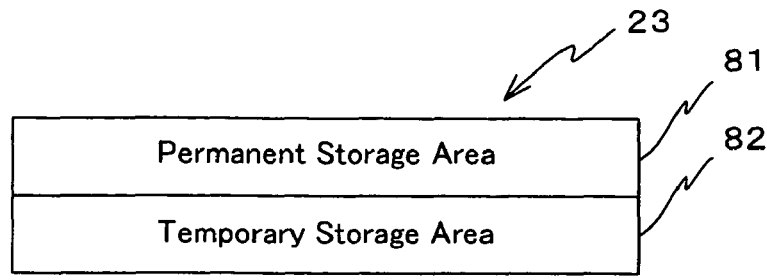
FIG. 4A is a diagram for describing a structure of a storage section in FIG. 3.
Figure 4B:
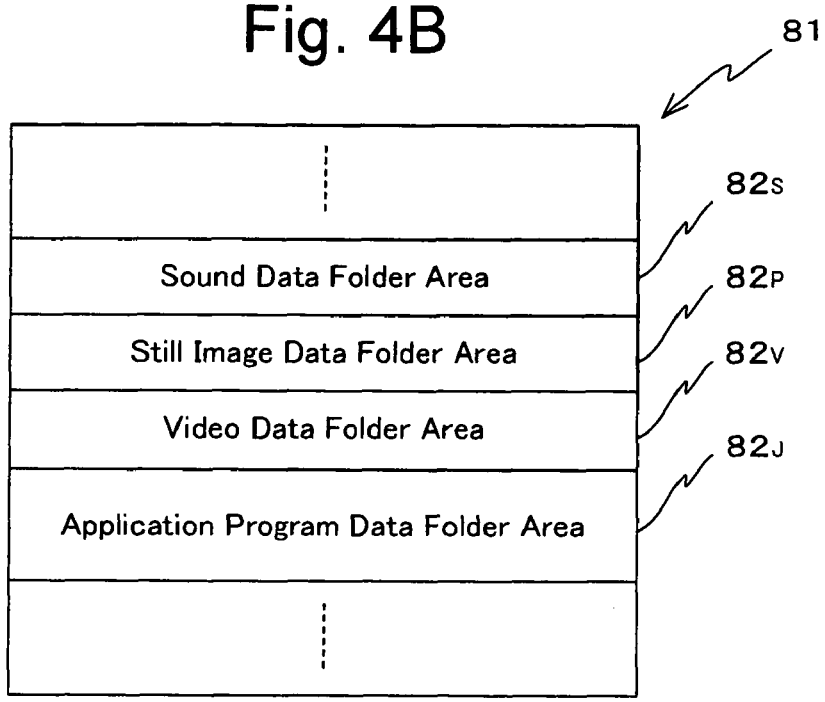
FIG. 4B is a diagram for describing a structure of a permanent storage area in FIG. 4A.

The storage section 23, as shown in FIG. 4A, includes a permanent storage area 81 which continues to hold stored data, and a temporary storage area 86 which holds temporarily the stored data, unless it receives an explicit instruction to delete the data from the user. In this case, the permanent storage area 81, as shown in FIG. 4B, includes a sound data folder area 82S, a still image data folder area 82P, a video data folder area 82V, and an application program data folder area 82J. The content data which is downloaded is stored in the area according to a type of data.

Figure 4C:
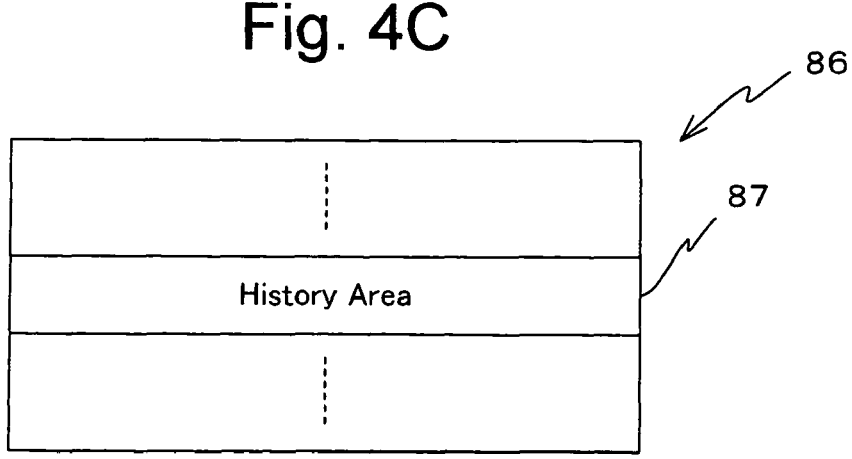
FIG. 4C is a diagram for describing a structure of a temporary storage area in FIG. 4A.

Moreover, in the temporary storage area 86, as shown in FIG. 4C, an application to be executed such as a browser application which is executed in the cellular phone 10 can secure an execution application history area 87. In the history area 87, a history of an operation of the execution application and so forth can be stored temporarily, and by referring to the history stored in the history area 87, the user can call a screen at a time of the previous operation and download data at that point of time. Note that when an amount of the history information exceeds [[to]] a data amount which can be stored in the history area 87, old history information is deleted automatically. Moreover, when the execution of the application is completed, the history area secured by the application is released.

Figure 5:
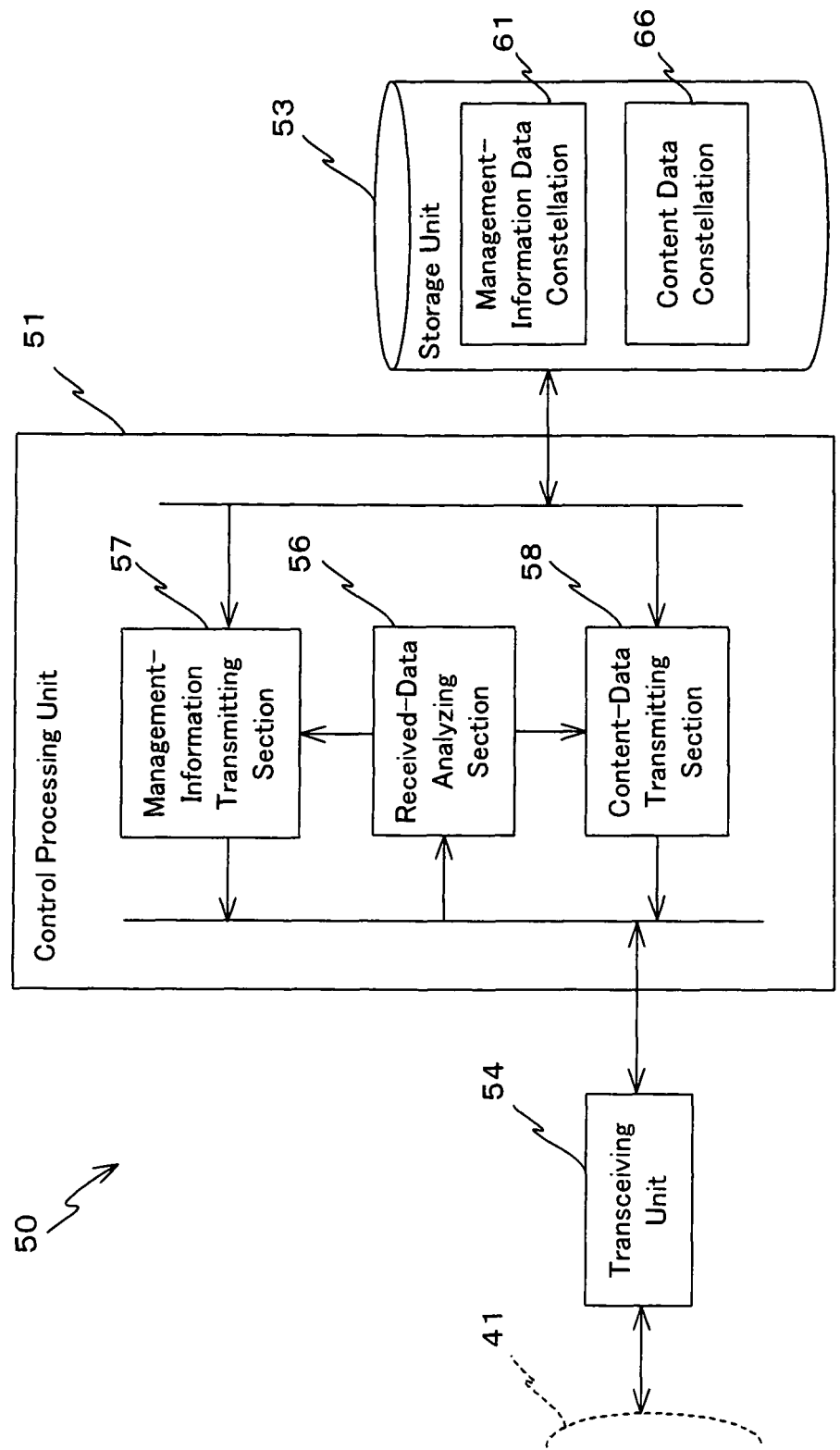
FIG. 5 is a block diagram showing schematically a structure of a content server in FIG. 1.

The content server 50, as shown in FIG. 5, includes (a) a control processing unit 51 which performs an integrated control of all operations of the content server 50, (b) a storage unit 53 which stores data such as a management-information data constellation 61 and content-data constellation 66, and (c) a transceiving unit 54 for performing communication via the communication network 41. In this case, the control processing unit 51 includes (i) a received-data analyzing section 56, (ii) a management-information transmitting section 57, and (iii) a content-data transmitting section 58. The received-data analyzing section 56 analyzes data which is input via the transceiving section 54. The management-information transmitting section 57 transmits the management information for which the request is made, to a unit which has issued the request for the management information, in response to the request for the management information. The content-data transmitting section 58 transmits the content data to a unit which has issued the request for the content data, according to the request for the download.

Figure 6A:
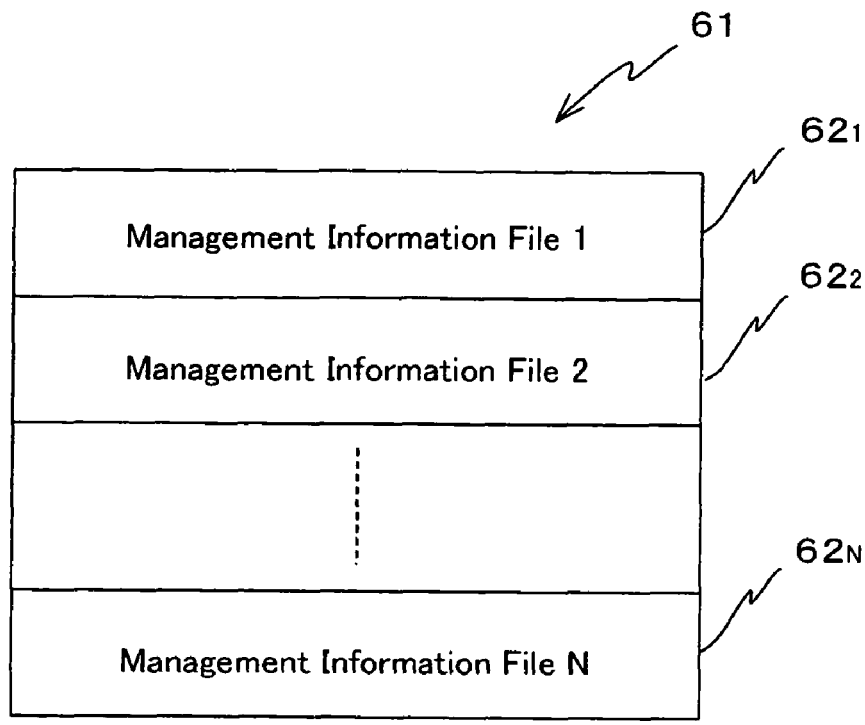
FIG. 6A is a diagram for describing a structure of a management-information constellation in FIG. 5.
Figure 6B:
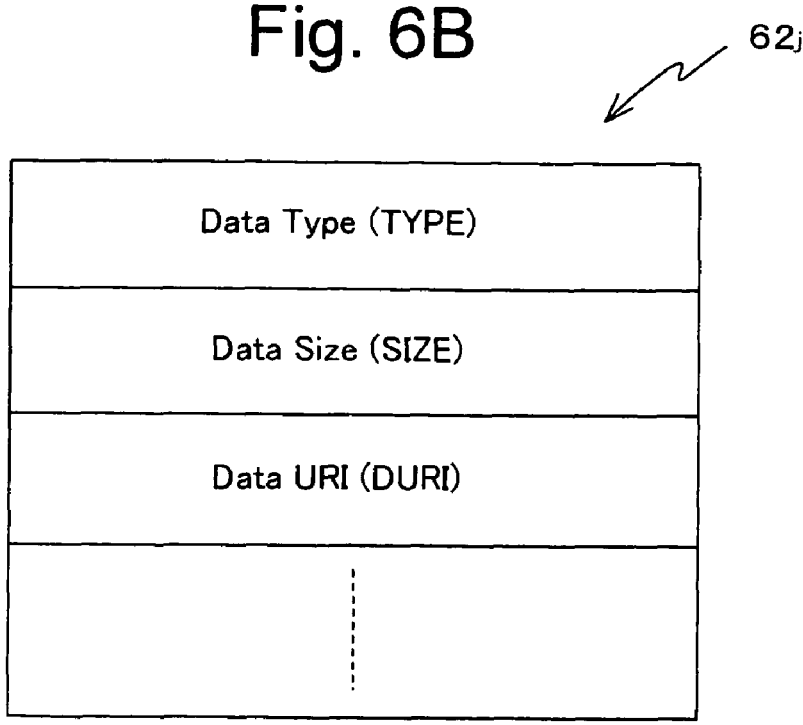
FIG. 6B is a diagram for describing a structure of a management-information file in FIG. 6A.

The management-information data constellation 61, as shown in FIG. 6A, includes a plurality of management-information files (N number of management-information files in the embodiment) $62_1$ to $62_N$. Moreover, in each management-information file $62_j$ (j=1~N), as shown in FIG. 6B, a type of the content data (TYPE), a size of the content data (SIZE), a URI (Uniform Resource Identifier) of the content data (DURI), such as XML (eXtensible Markup Language) corresponding to the management-information file $62_j$, are mentioned. Note that in the management-information file $61_j$, in addition to the type of the data (TYPE), the size of the data (SIZE), and the URI of the data (DURI), information of version of the management-information file 62j are also mentioned.

Figure 7A:
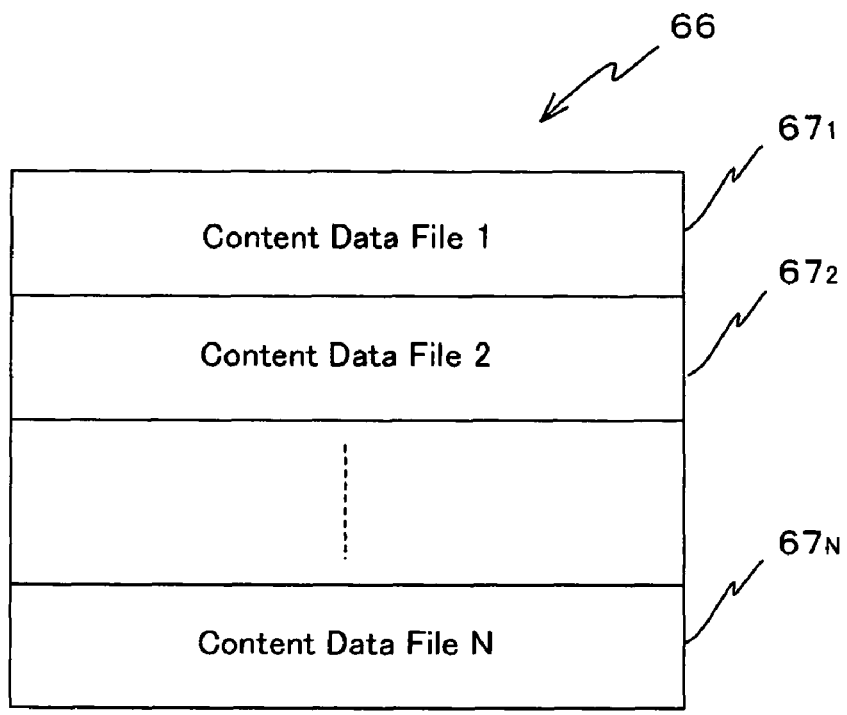
FIG. 7A is a diagram for describing a structure of a content-data constellation in FIG. 5.

The content-data constellation 66, as shown in FIG. 7A, includes a plurality of content-data files (N number of files in the embodiment) $67_1$ to $67_N$. In this case, each content-data file $67_j$ corresponds to the management-information file $62_j$.

Figure 7B:
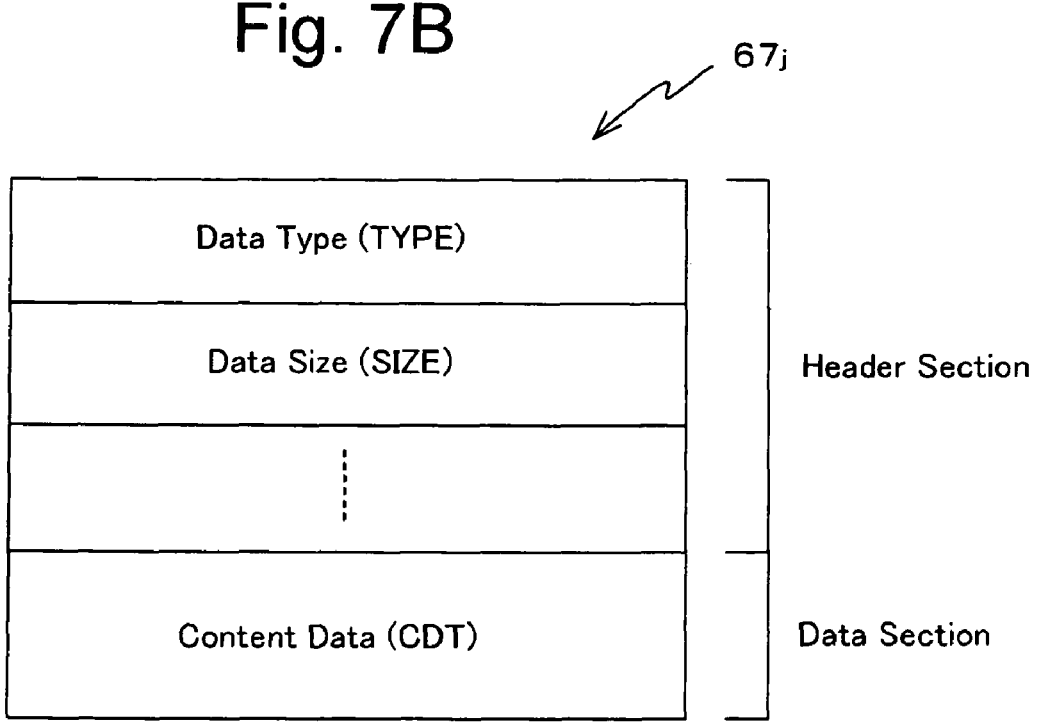
FIG. 7B is a diagram for describing a structure of a content-data file in FIG. 7A.

Each content-data file $67_j$ (j=1~N), as shown in FIG. 7B, includes a header section and a data section. In the header section, the type of the content data (TYPE) and the size of the content data (SIZE) are mentioned. Moreover, in the data section, the content data is stored.

Next, a downloading operation of the content data using a browser function of the cellular phone 10 in the data communication system 100 structured as mentioned above will be described by referring mainly to diagrams from FIG. 8 to FIG. 14, and other diagrams where deemed appropriate. Note that, in the cellular phone 10 the browser application is considered to be already executed.

Figure 8:
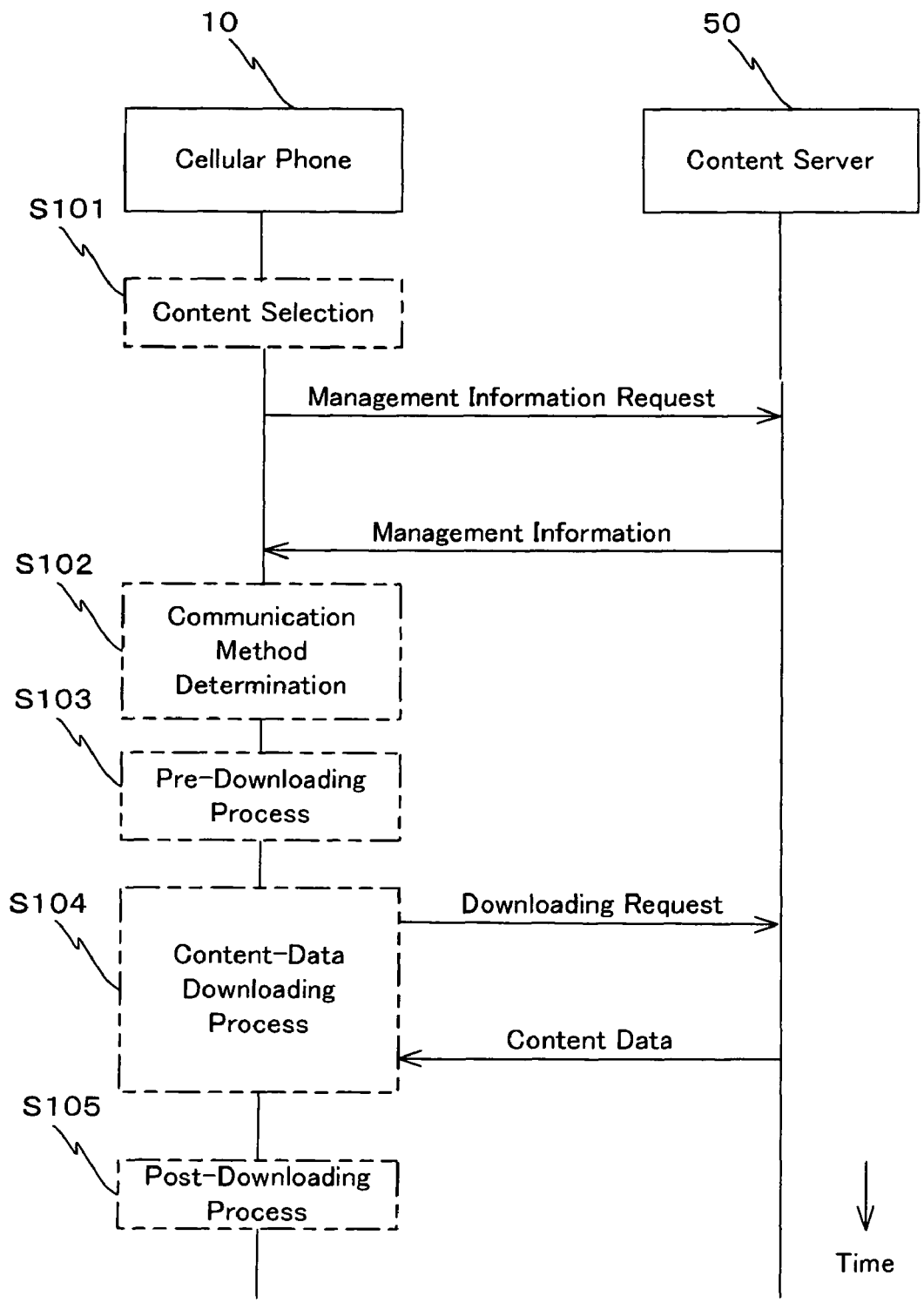
FIG. 8 is a sequence diagram for describing a downloading operation in the data communication system in FIG. 1.

First of all, at step S101 in FIG. 8, a user of the cellular phone 10 selects by operating the operating section 12, content data which the user desires to download. An example of display on the display section 13 at a time of selecting the content data is shown as screen F9 in FIG. 9. In the example of display in FIG. 9, an example of selecting a song (melody) title for informing an incoming call to the user when a call is received, is displayed. Note that a melody, an image, and a program for informing the user the incoming call when the call is received, can be let to be the content to be selected.

Figure 9:
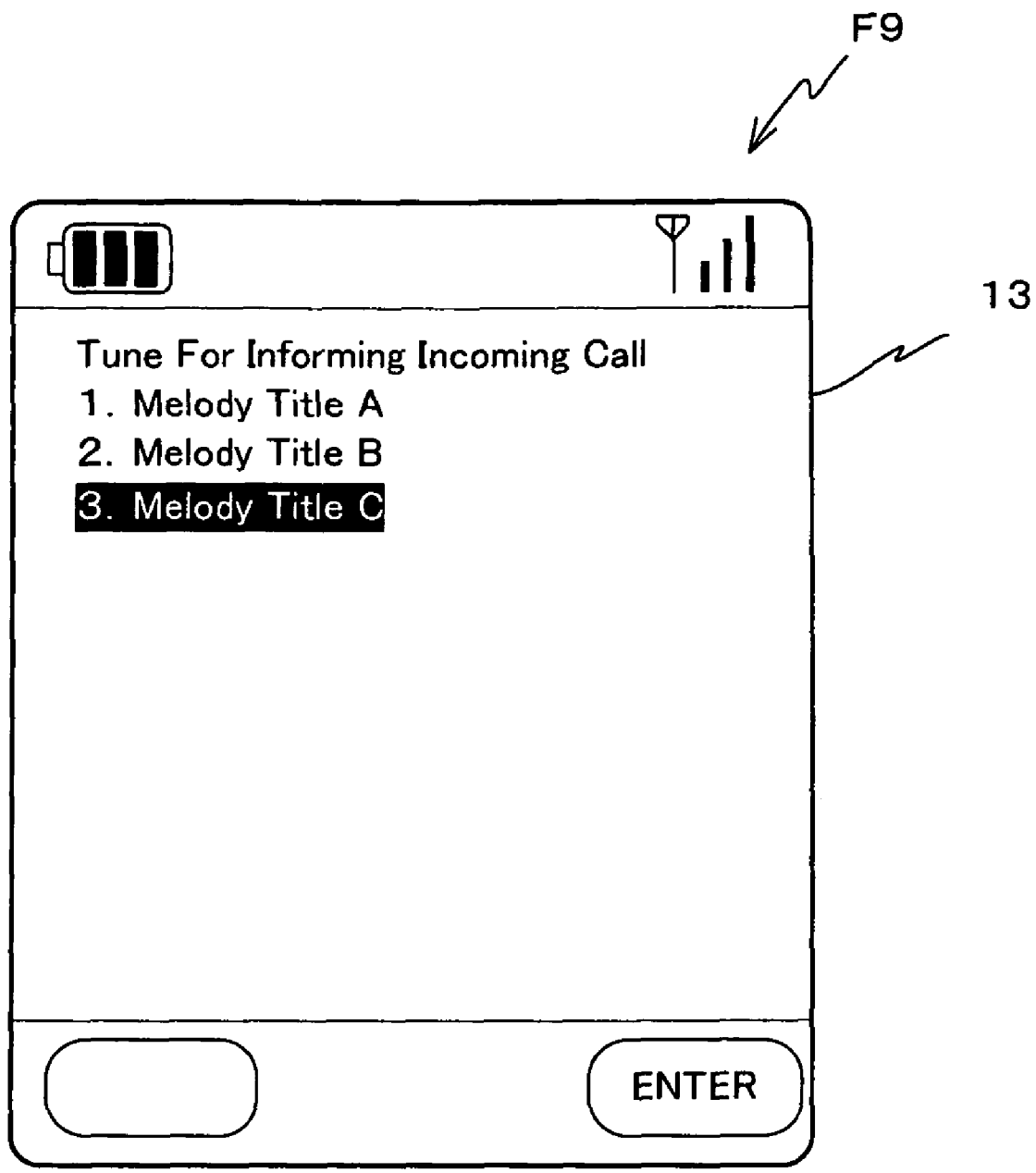
FIG. 9 is a diagram showing a display example at a time of selecting content data in FIG. 8.

When the content is selected by the user, in other words, when an "Enter" button on the operating section 12 in FIG. 9 is pressed, while looking at a display of a content selection screen, the management-information request making section 31 transmits a request for management information to content server 50 via the wireless transceiving section 24 with a content identifier (ID (IDentifier)) (in FIG. 9, an identifier of a song (melody) as a parameter for informing an incoming call of song (melody) title C). Note that the transmission of the request and transceiving then onward is performed by a packet communication method till a request for changing the communication method is made from the cellular phone. In this case, the content selection screen is stored in the history area 87 as history information together with status information at the time of display.

Coming back to FIG. 8, the request for the management information which is transmitted from the cellular telephone 10 reaches the content server 50 via the base station 42 and the communication network 41. In the content server 50, the received-data analyzing section 56 receives the request for the management information via the transceiving section 54. The received-data analyzing section 56 which has received the request for the management information analyzes the received data, and when the received data is a request for the management information, the received-data analyzing section 56 notifies to the management-information transmitting section 57 that the request for the management information is received, and the content identifier.

The management-information transmitting section 57 which has received the notification that the request for the management information is received, and of the content identifier, reads out the management-information file $62_k$ corresponding to the content identifier notified, from the management-information constellation 61 in the storage unit 53. Then, the management-information transmitting section 57 transmits the content of the management-information file $62_k$ which is read out, as the management information corresponding to the content identifier to the cellular phone 10 via the transceiving unit 54.

The management information which is transmitted from the content server 50 reaches the cellular phone 10 via the communication network 41 and the base station 42. In the cellular phone 10, the communication-method determining section 32 receives the management information via the wireless transceiving section 24. Thus, the communication-method determining section 32 which has received the management information, determines the communication method at step S102.

Figure 10:
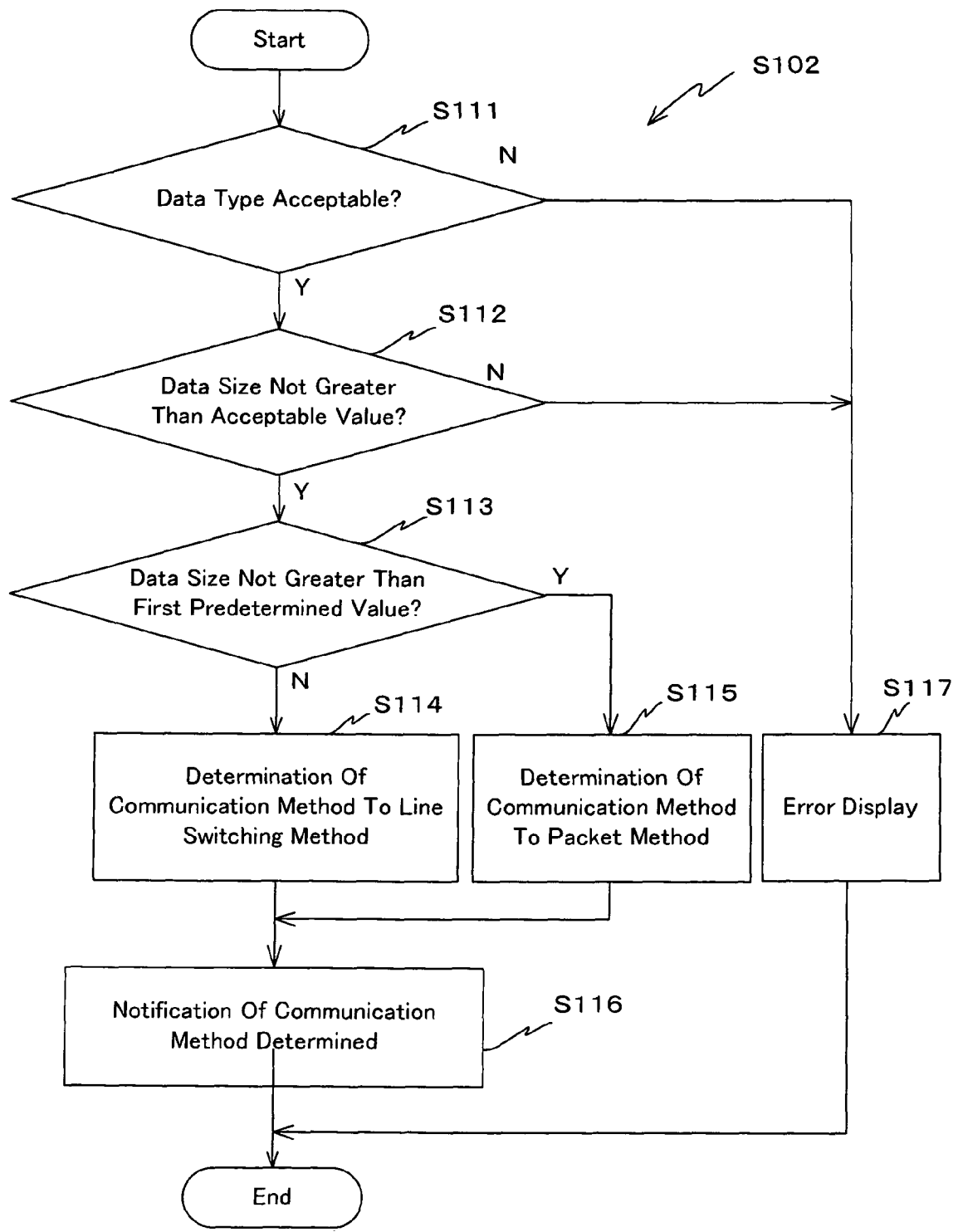
FIG. 10 is a flowchart for describing a process of determining a communication method in FIG. 8.

At step S102, first of all, at step S111 in FIG. 10, the communication-method determining section 32 makes a judgment of whether or not a data type (TYPE) in the management information received is acceptable. When the judgment is negative, the process is advanced to step S117. At step S117, in this case, the communication-method determining section 32 informs the user by displaying on the display section 13 an error message indicating that the data type in the management information is not acceptable. This error display screen is stored as history information in the history area 87. Then, the process is ended, and a downloading operation then onward is discontinued.

On the other hand, when the judgment at step S111 is affirmative, the process is advanced to step S112. At step S112, the communication-method determining section 32 makes a judgment of whether or not the data size (SIZE) in the management information received is not greater than an acceptable value. When the judgment is negative, the process is advanced to step S117. At step S117, in this case, the communication-method determining section 32 informs the user by displaying on the display section 13 an error message indicating that the data size in the management information exceeds the acceptable value. This error display screen is stored as history information in the history area 87. Then, the process is ended, and the downloading operation then onward is discontinued.

On the other hand, when the judgment at step S112 is affirmative, the process is advanced to step S113. At step S113, the communication-method determining section 32 makes a judgment of whether or not the data size in the management information received is not greater than a value determined in advance for determining the communication method (hereinafter, "first determined value"). Note that the first determined value is determined by packet-communication conditions such as a threshold value of number of time slots of usable packets in the cellular phone 10. When the judgment at step S113 is negative, the process is advanced to step S114. At step S114, the communication-method determining section 32 determines a line-switching communication method as the communication method for downloading.

On the other hand, when the judgment at step S113 is affirmative, the process is advanced to step S115. At step S115, the communication-method determining section 32 determines a packet communication method as the communication method for downloading.

When the communication method is determined at step S114 and step S115 in such manner, at step S116, the communication-method determining section 32 notifies the communication method determined and the management information to the downloading section 33. Thus, the process at step S102 is ended.

Figure 11:
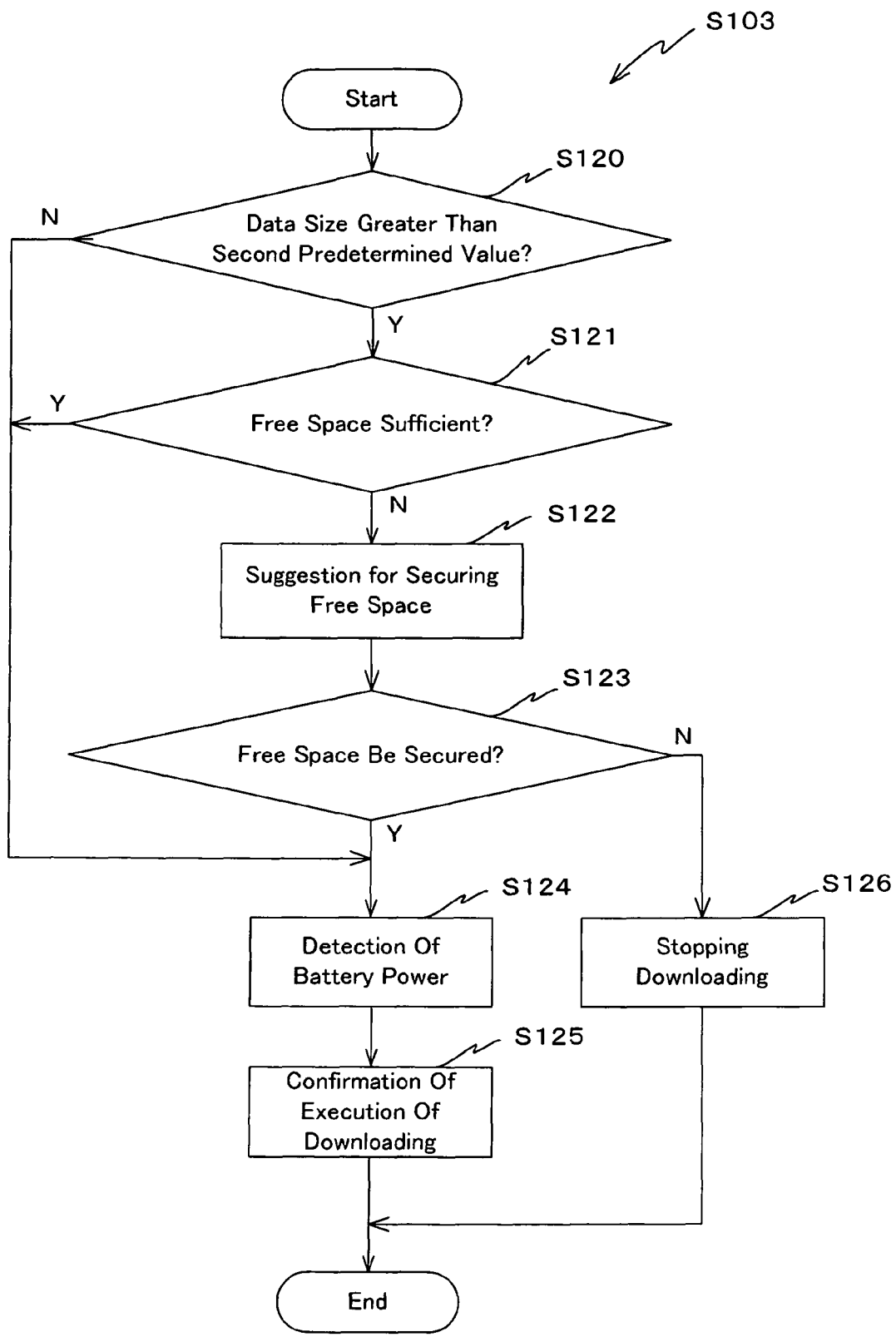
FIG. 11 is a flowchart for describing a pre-downloading process in FIG. 8.

Coming back to FIG. 8, as the step S102 is ended upon determining the communication method, at step S103, the downloading section 33 performs a pre-downloading process. At step S103, as shown in FIG. 11, first of all, at step S120, the downloading section 33 makes a judgment of whether or not the data size in the management information received is not greater than a value determined in advance for determining a destination to store the content data (hereinafter, "second predetermined value"). Note that the second predetermined value is determined by conditions of a size of the history area 87 secured by the browser application and a minimum number of histories stored in the history area 87.

When a judgment result at step S120 is negative, the downloading section 33 determines the history area 87 as a destination to store the content data. Then, the process is advanced to step S124 which will be described later.

On the other hand, when the judgment result at step S120 is affirmative, the downloading section 33 determines the permanent storage area 81 as a destination to store the content data. Then, the process is advanced to step S121.

At step S121, the downloading section 33 makes a judgment of whether or not there exists a sufficient free area for the content data in the permanent storage area 81. Note that this judgment is made upon taking into consideration the size of the free area for the content data, the data size in the management information, and an area used by computer programs which are executed simultaneously when necessary. In this case, when it is not necessary to take into consideration a competitive relationship between the processes executed simultaneously, the judgment is made by judging whether or not the size of the free area for the content date is not smaller than the data size in the management information.

When the judgment at step S121 is negative, at step S122, the downloading section 33 suggests the user to secure the free area. When the suggestion is made, an example of display on the display section 13 is shown as a screen F12A in FIG. 12. When the free area is not secured in the display of a screen for suggesting securing the free area, for example, when "No" is selected by an operation on the operating section 12 by the user in the display of the screen F12A, the process is advanced to step S126 which will be described later.

Figure 12:
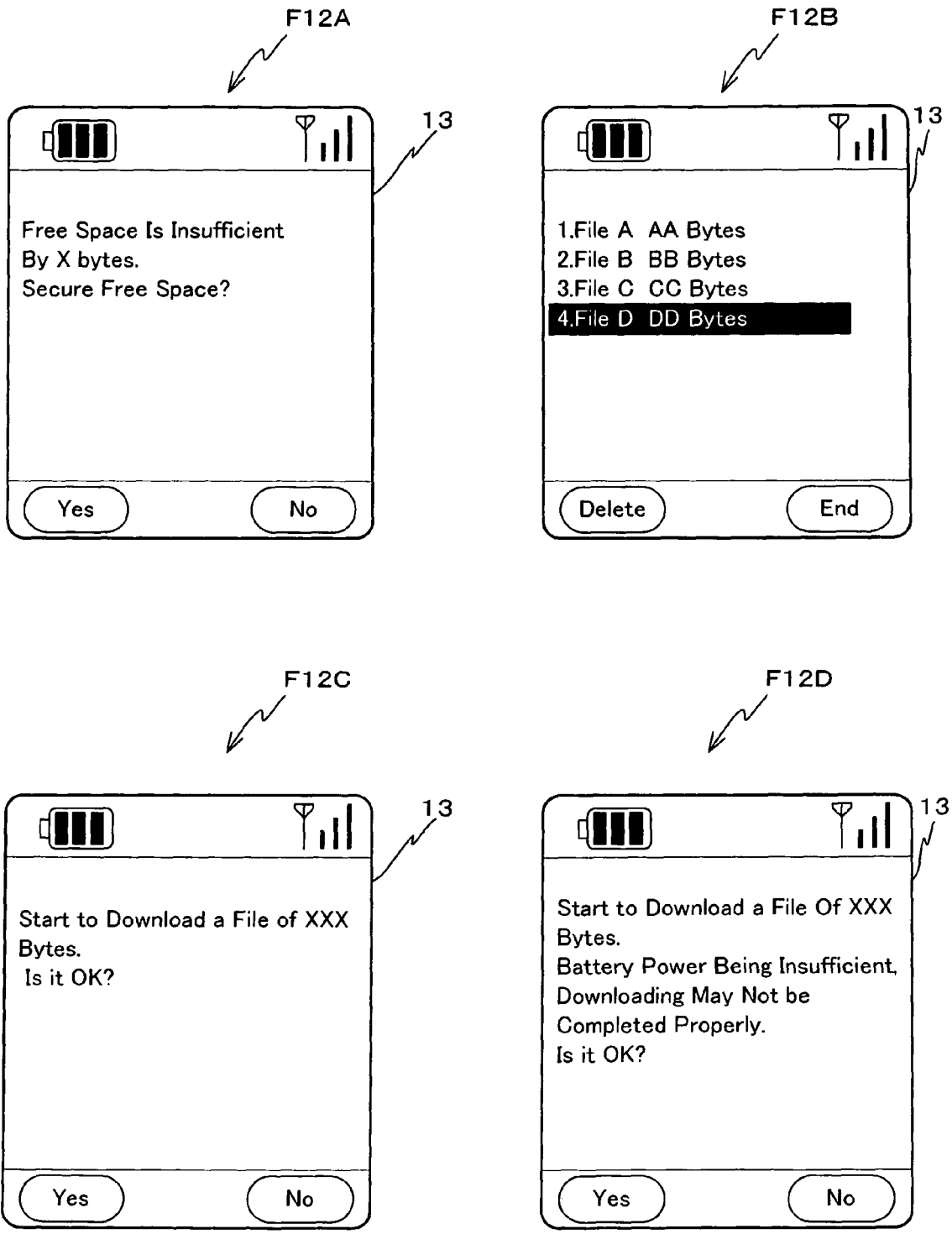
FIG. 12 is a diagram for describing a display example in the process in FIG. 10.

On the other hand, when the free area is secured in the display of the screen for suggesting securing free area, for example when "Yes" is selected by an operation on the operating section 12 by the user in the display of the screen F12A, a screen for securing the free area as a screen F12B in FIG. 12 is displayed. Then, the user secures the free area by deleting a file which can be deleted. Further, as the deletion of the file which can be deleted for securing the free area is ended, the process is moved to step S123.

Coming back to FIG. 11, at step S123, the downloading section 33 makes a judgment of whether or not the free area for the content data is secured. When the judgment is negative, the process is advanced to step S126. At step S126, the downloading section 33 displays on the display section 13 that the downloading operation was discontinued because the sufficient size of the free area could not be secured, and the downloading operation then onward is ended.

On the other hand, when the judgment at step S123 is affirmative, the process is advanced to step S124. At step S124, the downloading section 33 detects a power remained of a power source. Next, at step S125, the downloading section 33 confirms the execution of downloading. An example of a downloading confirmation screen which is displayed on the display section 13 at the time of confirmation is shown by a screen F12C and a screen F12D in FIG. 12. In this case, in the screen F12C, an example of display when there is sufficient power remained of the power source for downloading time which is presumed from the data size of the content data is shown. In the screen F12D, an example of display when it cannot be said that there is sufficient power remained of the power source is shown. Thus, the process at step S103 is ended.

When the downloading is not executed on the display of the downloading confirmation screen such as the screen F12C and the screen F12D, in other words, when "No" is selected by the operation of the operating section 12 by the user on the display of the screen F12C or the screen F12D, the downloading operation then onward is discontinued. On the other hand, when the downloading is executed on the display of the downloading confirmation screen, the content data downloading process at step S104 in FIG. 8 is started. In this case, the downloading confirmation screen is stored as history information in the history area 87 together with the status information at the time of the display.

Figure 13:
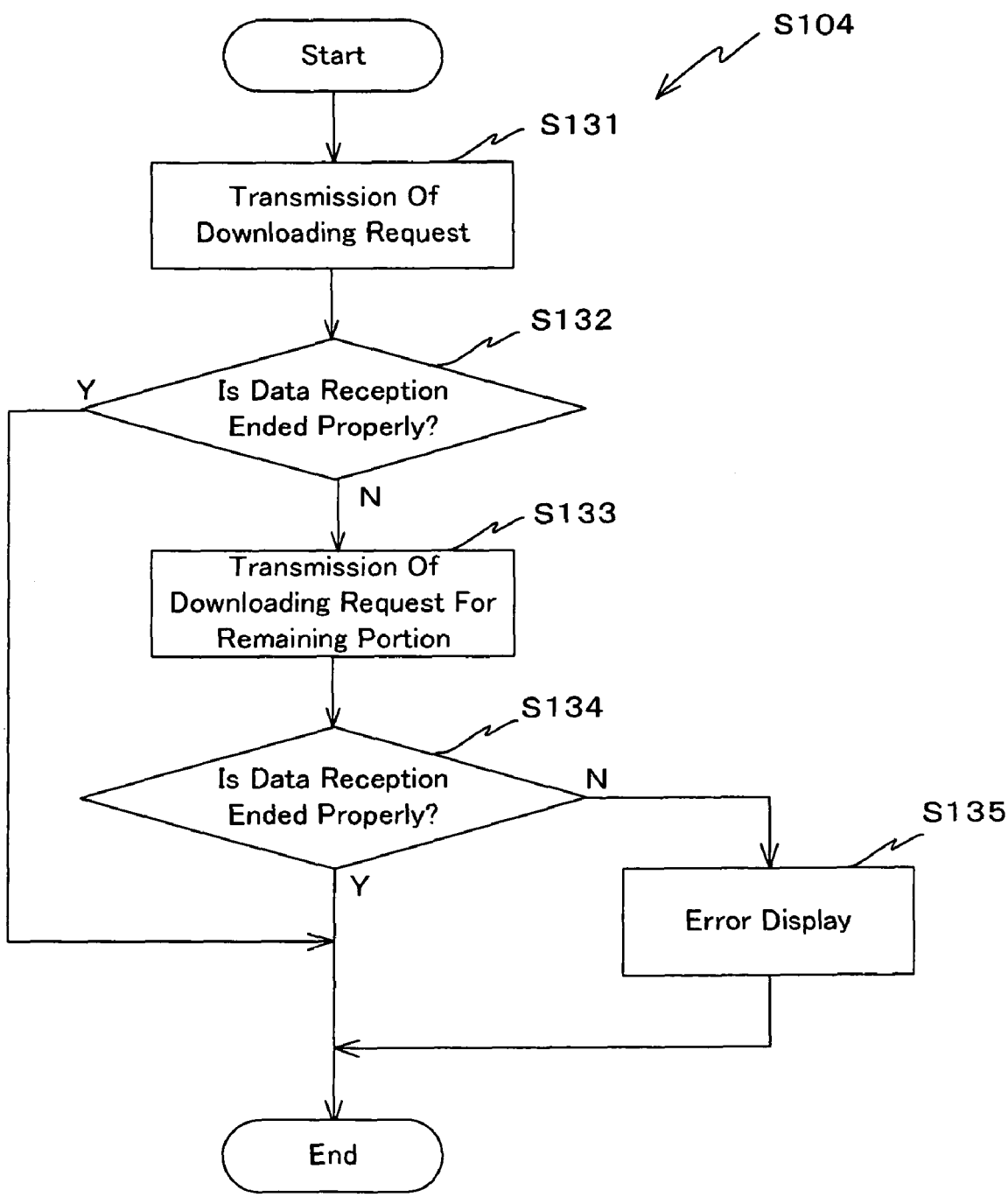
FIG. 13 is a flowchart for describing a process of downloading content data in FIG. 8.

At step S104, as shown in FIG. 13, first of all, at step S131, the downloading section 33 specifies the communication method which is determined, and transmits a request for downloading to the content server 50 via the wireless transceiving section 24 with a URI of the content data (DURI) as a parameter. Then, the data communication is performed according to the communication method which is determined.

Coming back to FIG. 8, the request for downloading which is transmitted from the cellular phone 10 reaches the content server 50 via the base station 42 and the communication network 41. In the content server 50, the received-data analyzing section 56 receives the request for downloading via the transceiving unit 54. The received-data analyzing section 56 which has received the request for downloading analyzes the received data, and when the received data is a request for downloading, the received-data analyzing section 56 notifies to the content-data transmitting section 58 that the request for downloading is received, and the URI of the content data.

The content-data transmitting section 58 which has received the notification that the request for the downloading, and of the URI of the content data, reads out the content-data file $67_k$ corresponding to the URI of the content data notified, from the content-data constellation 61 in the memory unit 53. Then, the content-data transmitting section 58 transmits the content of the content-data file $62_k$ which is read out, to the cellular phone 10 via the transceiving unit 54.

The content data which is transmitted from the content server 50 reaches the cellular phone 10 via the communication network 41 and the base station 42 according to the communication method which is specified above. In the cellular phone 10, the downloading section 33 receives the content data via the wireless transceiving section 24, and stores the content data in a storage area which is determined at step S120 mentioned earlier. Note that when the permanent storage area 81 is a destination to store the content data, the downloading section 33 stores the content data received in an area of the permanent storage area 81 corresponding to the type of the content data. For example, when the type of data is a sound data, the content data downloaded is stored in the sound data folder area 82S. During this operation of receiving, a predetermined animation is displayed on the display section 13.

Coming back to FIG. 13, as the operation of receiving the content data is ended, the downloading section 33, at step S132, makes a judgment of whether or not the data reception is ended properly. When the judgment is affirmative, the process at step S104 is ended.

On the other hand, when the judgment at step S132 is negative due to an occurrence of line disconnect and time out etc., the process is advanced to step S133. At step S133, the downloading section 33 transmits a request for downloading of a remaining portion in which a position of the remaining portion and the URI of the content data are let to be parameters, for the remaining portion other than a portion which could already be downloaded, is transmitted to the content server 50 via the wireless transceiving section 24.

The request for downloading of the remaining portion which is transmitted from the cellular phone 10 reaches the content server 50 via the base station 42 and the communication network 41. In the content server 50, the received-data analyzing section 56 receives the request for downloading of the remaining portion via the transceiving unit 54. The received-data analyzing section 56 which has received the request for downloading of the remaining portion, analyzes the received data, and when the received data is a request for downloading of the remaining portion, the received-data analyzing section 56 notifies to the content-data transmitting section 58 that the request for downloading of the remaining portion is received, and the position of the remaining portion and the URI of the content data.

The content-data transmitting section 58 which has received the notification that the request for downloading of the remaining portion, and of the position of the remaining portion and the URI of the content data, reads out the remaining portion in the content-data file $67_k$ corresponding to the URI of the content data notified. Then, the content-data transmitting section 58 transmits the content of the remaining portion which is read out, to the cellular phone 10 via the transceiving unit 54.

The remaining-portion data which is transmitted from the content server 50 reaches the cellular phone 10 via the communication network 41 and the base station 42. In the cellular phone 10, the downloading section 33 receives the remaining-portion data via the wireless transceiving section 24, and stores the remaining-portion data in a storage area which is determined at step S120 earlier.

Coming back to FIG. 13, as the operation of receiving the remaining-portion data is ended, the downloading section 33, at step S134, makes a judgment of whether or not the operation of the data reception is ended properly. When the judgment is affirmative, the process at step S104 is ended.

On the other hand when the judgment at step S134 is negative, the process is advanced to step S135. At step S135, an error message indicating that the content data could not be downloaded is displayed, and the downloading operation from then onward is discontinued.

Figure 14:
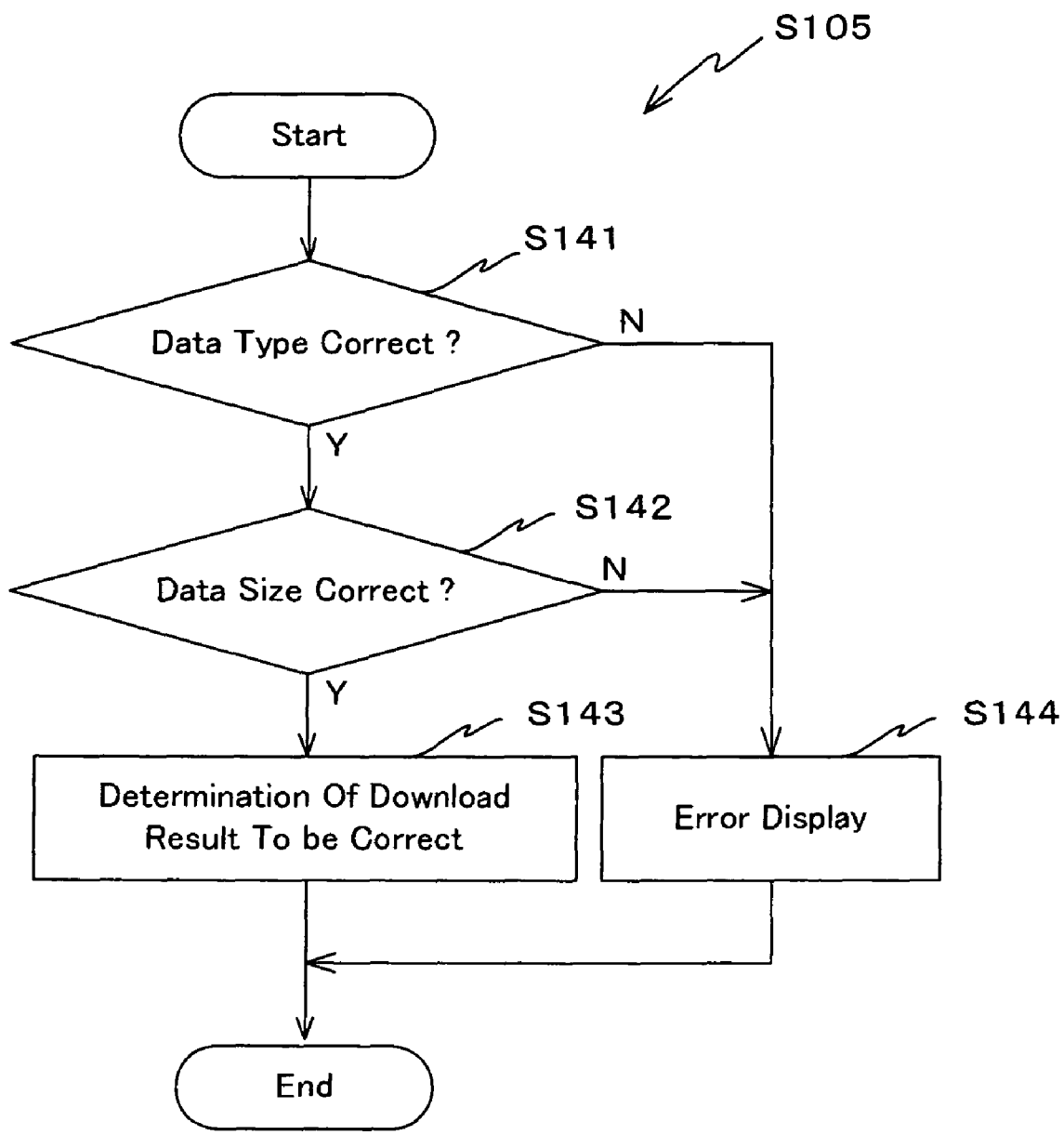
FIG. 14 is a flowchart for describing a post-downloading process in FIG. 8.

Coming back to FIG. 8, when the entire content data is received properly, at step S105, the downloading section 33 performs a post-downloading process. At step S105, as shown in FIG. 14, first of all, at step 141, a judgment of whether or not the data type in the management information and a data type in the header section of the content data match is made. When the judgment is negative, the process is advanced to step S144. At step S144, in this case, an error message indicating that the data types do not match is displayed on the display section 13. This error-display screen is stored as history information in the history area 87. Then, the downloading section 33 deletes the content data received, and the process at step S105 is ended.

On the other hand, when the judgment at step S141 is affirmative, the process is advanced to step S142. At step S142, a judgment of whether or not the data size in the management information and a data size in the header section of the content data match, is made. When the judgment is negative, the process is advanced to step S144. At step S144, in this case, an error message indicating that the data sizes do not match is displayed on the display section 13. This error-display screen is stored as history information in the history area 87. Then, the downloading section 33 deletes the content data received, and the process at step S105 is ended.

On the other hand, when the judgment at step S142 is affirmative, the process is advanced to step S143. At step S143, the downloading section 33 authenticates to be correct the content data which is downloaded, and displays on the display section 13 that the downloading process is ended properly.

A transition to operation state in the past associated with an access to the content which is made by referring to the history area 87 is performed according to a command from the user. Note that when a command for returning to a state in the history one step prior to a state where the downloading process is ended properly is made by the user, the transition is not made to a display state of the downloading confirmation screen (refer to the screen F12C and the screen F12D in FIG. 12) in which a command for the downloading execution is made, but is made to a display state of the content selection screen (refer to the screen F9 in FIG. 9) in which a request for the start of the previous downloading operation is made.

As it is described above, in this embodiment, first of all, the cellular phone 10 transmits the request for the management information which includes the size information of the content data which is desired to be downloaded. The content server 50 which has received the request for the management information transmits the management information to the cellular phone 10. Next, the cellular phone 10 which has received the management information makes the judgment of whether or not the size of the content data exceeds the second predetermined size, based on the size information of the content data which is included in the management information. When the judgment result is negative, the cellular phone 10 transmits the request for downloading of the content data. Then the cellular phone 10 receives the content data which is sent back from the content server 50 is response to the request for the downloading, and stores the content data in the history area 87 of the temporary storage area 86.

On the other hand, when the judgment result is affirmative, the cellular phone 10 makes a judgment of whether or not there exists a free area for storing the content data, in the permanent storage area 81. When the judgment is affirmative, the cellular phone 10 transmits the request for downloading of the content data. The cellular phone 10 receives the content data which is sent from the content server 50 in response to the request for downloading, and stores the content data in the permanent storage area 81.

As a result of this, the content data is stored accordingly either in the temporary storage area 86 or the permanent storage area 81 when possible, according to the size. Therefore, history of appropriate number of operations can be held in the temporary storage area without providing a large temporary storage area, and the purpose is served without performing an operation of unnecessary downloading. Consequently, according to the embodiment, the convenience for the user can be improved by a simple structure.

Moreover, in this embodiment, when the judgment result related to the free area is negative, the cellular phone 10 suggests the user to secure the size of the free area not smaller than the size of the content data. Therefore, the user can make a judgment of whether or not it is necessary to secure the storage area for the content data before downloading.

Furthermore, in this embodiment, the cellular phone 10 which has received the management information determines the data-communication method which is to be used for downloading the content data, based on the size information in the management information, and upon specifying the communication method which is determined, transmits the request for downloading of the content data. Therefore, since a suitable communication method according to the data size of the content data to be downloaded is selected, it is possible to complete the downloading of the object data in a reasonable time without causing a decline in an efficiency of a data line.

Moreover, in the embodiment, the cellular phone 10 displays the data size (SIZE) in the management information, and entrusts to a judgment of the user as to whether or not to execute the downloading. Therefore, the user, upon looking at the size of the object data, and taking into consideration the downloading time predicted, and a lead time for downloading at that point of time, can determine whether or not to download the content data at that point of time.

Furthermore, in the embodiment, when the downloading of the content data is ended due to an occurrence of a communication error and so forth, the cellular phone 10 is let to make a request for downloading of the remaining portion which is a request for downloading related to the remaining portion which is a portion other than a portion which is already downloaded. Therefore, even when the downloading of the content data is ended half way, the purpose is served only by downloading only the remaining portion at the time of completion of the previous downloading operation, without performing the downloading of the entire object data once again. Consequently, it is possible to download the content data efficiently.

Note that in the embodiment, the cellular phone 10 is let to make the request for downloading of the remaining portion only once. The cellular phone 10 can also be let to make the request for downloading of the remaining portion for a plurality of times.

Moreover, in the embodiment, the data to be downloaded is let to be content data. However, the present invention is also applicable for normal data.

Figure 15:
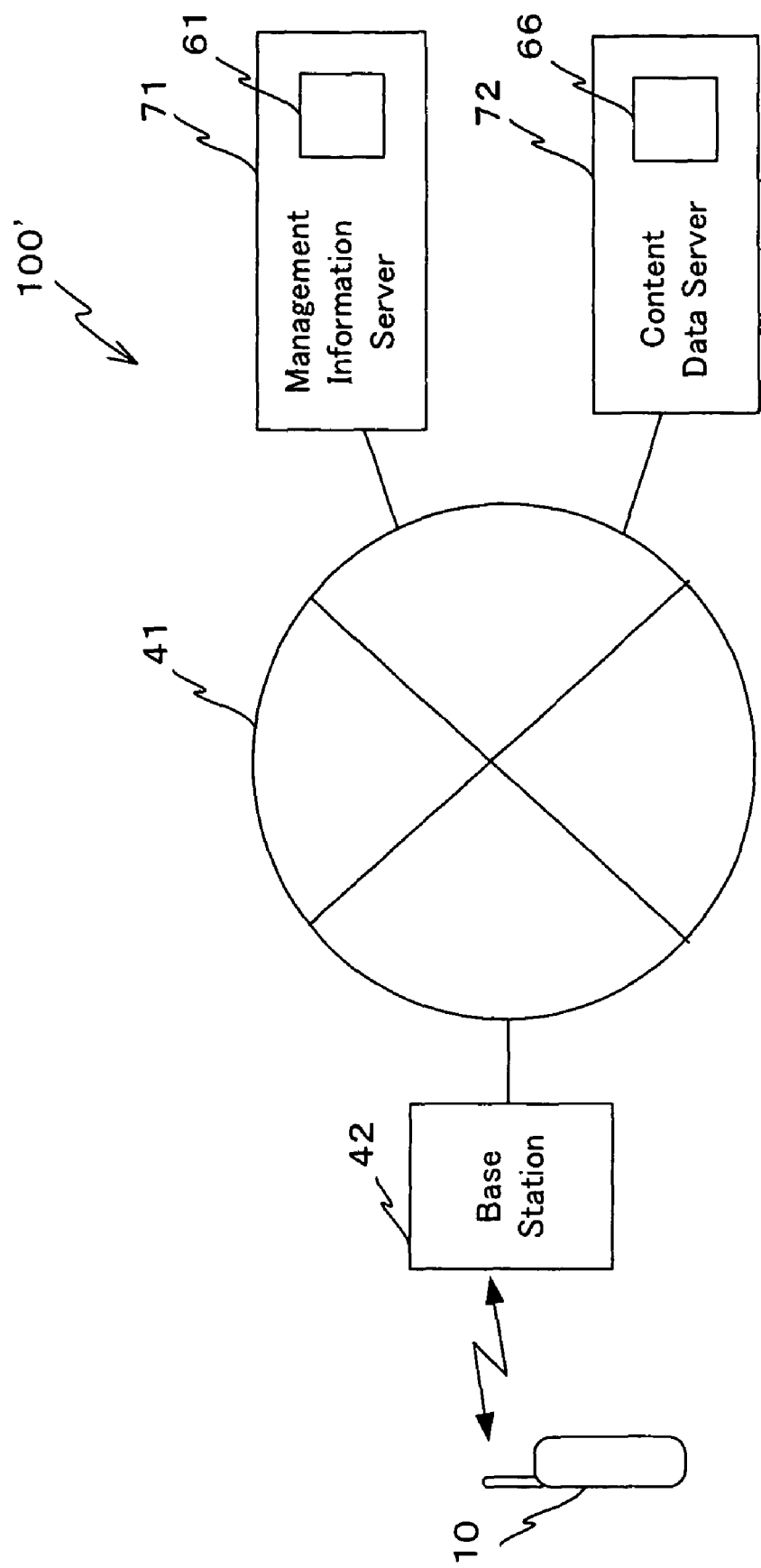
FIG. 15 is a diagram for describing a modified embodiment.

Furthermore, in the embodiment, the content server 50 is let to perform management of both the management-information file and the content-data file. However, a data communication system 100' as shown in FIG. 15, instead of the content server 50, can also be structured to include a management-information server 71 which performs management of the management-information files, and a content-data server 72 which performs management of the content-data files.

Moreover, in the embodiment, the present invention is applied to case in which the communication terminal is a cellular phone. However, the present invention is also applicable to other types of mobile communication terminals, and even to a normal information communication terminal.

As it has been described above, a method for data communication and a data communication system of the present invention is useful for downloading data to a communication terminal. Moreover, a mobile communication terminal of the present invention can be used in a mobile terminal which downloads data.

What is claimed is:

1. A method for data communication of downloading data to a mobile communication terminal which is in a process of executing a browser application, comprising steps of:

making a request for object-data management information, wherein the mobile communication terminal transmits a request for object-data management information which includes size information of object data desired to be downloaded;

receiving the object-data management information by the mobile communication terminal;

judging a data size wherein the mobile communication terminal makes a judgment of whether or not a size of the object data exceeds a predetermined size, based on the size information of the object data;

making a request for a first downloading, wherein when a judgment result at the step of judging the data size is negative, the mobile communication terminal transmits a request for downloading the object data;

performing the first downloading to download the object data to the mobile communication terminal;

storing a first object data, wherein the mobile communication terminal receives the object data and stores the object data in a temporary storage area which stores a history of the browser application, the temporary storage area being located in the mobile communication terminal;

judging a free area, wherein, when the judgment result at the step of judging the data size is affirmative, a judgment of whether or not there exists a free area for storing the object data in a permanent storage area in which stored data is not deleted when there is no explicit command from a user is made, the permanent storage area being located in the mobile communication terminal;

when the judgment result at the step of judging the free area is negative, suggesting that a free space be secured and judging whether the free space has been secured;

making a request for a second downloading, wherein, when a judgment result at the step of judging the free area is affirmative, the mobile communication terminal transmits a request for downloading the object data; and storing a second object data, wherein the mobile communication terminal receives the object data and stores the object data in the permanent storage area.

2. The method for data communication according to claim 1, wherein said suggesting includes the mobile communication terminal suggesting the user to secure a size of the free space not smaller than a size of the object data.

3. The method for data communication according to claim 1, further comprising a step of:

determining a data communication method which is to be used for downloading the object data, based on the size information, by the mobile communication terminal which has received the object-data management information, wherein at the step of making the request for downloading, a request for downloading of the object data is transmitted upon specifying the communication method which is determined.

4. The method for data communication according to claim 1, further comprising a step of:

confirming a request for downloading, wherein, the mobile communication terminal which has received the object-data management information entrusts to a judgment of the user of the mobile communication terminal as to whether or not to execute the step of making the request for downloading upon displaying the size of the object data.

5. The method for data communication according to claim 1, further comprising steps of:

making a request for downloading of a remaining portion, wherein, when the downloading of the object data is not completed at the step of storing the object data, the mobile communication terminal makes a request for downloading a remaining portion which is a request for downloading related to the remaining portion which is a portion other than a portion which is already downloaded; and storing the remaining portion, wherein, the mobile communication terminal receives the remaining portion and stores the remaining portion in the permanent storage area.

6. A data communication system which downloads data to a mobile communication terminal which is in a process of executing a browser application, wherein the mobile communication terminal comprises:

a processor and a memory;

a means for making a request for object-data management information which transmits a request for object-data management information which comprises size information of object data desired to be downloaded;

a data-size judging means for making a judgment of whether or not a size of the object data exceeds a predetermined size, based on the size information of the object data;

a first-downloading means for transmitting a request for downloading the object data, for downloading the object data to the mobile communication terminal, and for storing the object data which is sent back, in a temporary storage area which stores a history of the application, when a judgment result of the judgment made by the data-size judging means is negative;

a free area judging means for making a judgment of whether or not there exists a, free area for storing the object data in a permanent storage area in which stored data is not deleted when there is no explicit command from a user, when the judgment result of the judgment made by the data-size judging means is affirmative, the permanent storage area being located in the mobile communication terminal;

a suggesting and judging means for suggesting that a free space be secured and for judging whether the free space has been secured, when the judgment result of the judgment made by the free area judging means is negative; and a second-downloading means for transmitting a request for downloading the object data, and for storing the object data which is sent back in response to the request for downloading, in the permanent storage area, when the judgment result of the judgment made by the free area judging means is affirmative.

7. The data communication system according to claim 6, comprising:

a management information server unit which transmits the object-data management information to the mobile communication terminal, in response to a request for the object-data management information; and an object-data server unit which transmits the object data by the communication method determined, to the mobile communication terminal, in response to a request for downloading.

8. The data communication system according to claim 7, wherein the management-information server unit and the object-data server unit are one and the same unit.

9. The data communication system according to claim 7, wherein the management-information server unit and the object-data server unit are mutually different units, and the object data management information comprises information of a position at which the object-data server unit is located.

10. The data communication system according to claim 6, wherein the temporary storage area is located in the mobile communication terminal.

11. A mobile communication terminal which is capable of executing a browser application, comprising:

a processor and a memory;

a means for making a request for object-data management information which transmits a request for object-data management information which comprises size information of object data desired to be downloaded while executing the browser application;

a data-size judging means for making a judgment of whether or not a size of the object data exceeds a predetermined size, based on the size information of the object data;

a first-downloading means for transmitting a request for downloading the object data, for downloading the object data to the mobile communication terminal, and for storing the object data which is sent back, in a temporary storage area which stores a history of the application, when a judgment result of the judgment made by the data-size judging means is negative;

a free area judging means for making a judgment of whether or not there exists a free area for storing the object data in a permanent storage area in which stored data is not deleted when there is no explicit command from a user, when the judgment result of the judgment made by the data-size judging means is affirmative, the permanent storage area being located in the mobile communication terminal;

a suggesting and judging means for suggesting that a free space be secured and for judging whether the free space has been secured, when the judgment result of the judgment made by the free area judging means is negative; and a second-downloading means for transmitting a request for downloading the object data, and for storing the object data which is sent back in response to the request for downloading, in the permanent storage area, when a judgment result of the judgment made by the free area judging means is affirmative.

12. The mobile communication terminal according to claim 11, wherein the suggesting that a free space be secured includes suggesting a user to secure a size of the free space not smaller than a size of the object data.

13. The mobile communication terminal according to claim 11, further comprising:

a data-communication method determining means for determining a data-communication method to be used for downloading the object data, based on the size information, wherein the first downloading means and the second downloading means transmit a request for downloading of the object data upon specifying the communication method which is determined.

14. The mobile communication terminal according to claim 11, wherein the first downloading means and the second downloading means entrust to a judgment of the user as to whether or not to transmit the request for downloading upon displaying the size of the object data.

15. The mobile communication terminal according to claim 11, wherein, the permanent storage area is divided according to a type of data, the object-data management information further comprises information of a type of object data, and the temporary storage area is located in the mobile communication terminal.

* * * * *